United States Patent
Udrea et al.

(10) Patent No.: US 12,456,072 B2
(45) Date of Patent: Oct. 28, 2025

(54) METHOD AND SYSTEM FOR AUTOMATING SCENARIO PLANNING

(71) Applicant: International Business Machines Corporation, Armonk, NY (US)

(72) Inventors: Octavian Udrea, Valhalla, NY (US); Shirin Sohrabi Araghi, Briarcliff Manor, NY (US); Michael Katz, Goldens Bridge, NY (US); Mark David Feblowitz, Winchester, MA (US); Kavitha Srinivas, Port Chester, NY (US); Oktie Hassanzadeh, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 17/207,805

(22) Filed: Mar. 22, 2021

(65) Prior Publication Data
US 2022/0300852 A1    Sep. 22, 2022

(51) Int. Cl.
  *G06F 21/12*    (2013.01)
  *G06F 40/20*    (2020.01)
  *G06F 40/289*   (2020.01)
  *G06N 20/00*    (2019.01)

(52) U.S. Cl.
  CPC ............. *G06N 20/00* (2019.01); *G06F 40/20* (2020.01); *G06F 40/289* (2020.01)

(58) Field of Classification Search
  CPC ........ G06F 40/35; G06F 40/289; G06F 40/30; G06F 40/20; G06F 16/367; G06F 16/9024; G06F 16/903; G06F 40/40; G06F 40/56; G06F 16/36

See application file for complete search history.

(56) References Cited

U.S. PATENT DOCUMENTS

| | | | |
|---|---|---|---|
| 9,785,755 B2 | 10/2017 | Riabov | |
| 11,731,663 B2 * | 8/2023 | Zeng | B60W 40/072 701/23 |
| 11,922,129 B2 | 3/2024 | Bhandari et al. | |
| 2003/0069869 A1 | 4/2003 | Gronau et al. | |
| 2003/0149571 A1 | 8/2003 | Francesco et al. | |
| 2008/0071716 A1 | 3/2008 | Anderson et al. | |
| 2009/0089106 A1 | 4/2009 | Park et al. | |
| 2014/0052494 A1 | 2/2014 | Anne | |

(Continued)

FOREIGN PATENT DOCUMENTS

EP    3086239    10/2016

OTHER PUBLICATIONS

FreeMind—free mind mapping software, pp. 1-7, Downloaded From hitp:/reemind.sourceforge.net/wiki/ ndex.php/Main_Page, Nov. 19, 2018 (U.S. Pat. No. 11,755,923) (Year: 2018).*

(Continued)

*Primary Examiner* — Olujimi A Adesanya
(74) *Attorney, Agent, or Firm* — Daniel M. Yeates

(57) ABSTRACT

Embodiments are provided that relate to a computer system, a computer program product, and a computer-implemented method for automating scenario planning. Embodiments involve machine learning (ML) and an artificial intelligence (AI) planner to capture a general scenario planning (GSP) problem and provide a solution to the GSP problem in the form of trajectories.

17 Claims, 10 Drawing Sheets

(56) References Cited

U.S. PATENT DOCUMENTS

| | | | |
|---|---|---|---|
| 2014/0101079 A1* | 4/2014 | Deal | G06N 5/045 706/12 |
| 2017/0060868 A1* | 3/2017 | Rais Ghasem | G06F 16/243 |
| 2017/0075859 A1* | 3/2017 | Bnayahu | G06N 5/045 |
| 2018/0218300 A1 | 8/2018 | Chang et al. | |
| 2018/0300427 A1* | 10/2018 | Harbison | G06F 16/90335 |
| 2019/0206400 A1* | 7/2019 | Cui | B25J 9/1697 |
| 2019/0340525 A1* | 11/2019 | Katz | G05B 13/041 |
| 2019/0347363 A1* | 11/2019 | Kishimoto | G06F 16/90332 |
| 2020/0012954 A1* | 1/2020 | Botea | G06F 40/35 |
| 2020/0074315 A1 | 3/2020 | Katz et al. | |
| 2020/0160483 A1 | 5/2020 | Riabov et al. | |
| 2020/0202233 A1 | 6/2020 | Hashimoto et al. | |
| 2020/0401910 A1 | 12/2020 | Hassanzadeh et al. | |
| 2021/0004741 A1* | 1/2021 | Katz | G06N 5/01 |

OTHER PUBLICATIONS

Zarzour a et al. "Conflict-Free Collaborative Decision-Making over Mind-Mapping," 2014 Fourth International Conference on Advanced Computing & Communication Technologies, Rohtak, India, 2014, pp. 509-515 (Year: 2014).*

Li, Pengeri, "Knowledge-oriented convolutional neural network for causal relation extraction from natural language texts", Expert Systems with Applications 115, pp. 512-523 (2019).

Cardoso, Joana F., et al., "The Use and Value of Scenario Planning", Modern Management Science & Engineering, vol. 2, No. 1 (2014).

Li, Zhongyang, et al., "Guided Generation of Cause and Effect", Proceedings of the Twenty-Ninth International Joint Conference on Artificial Intelligence (IJCAI-20), pp. 3629-3636, (2020).

Keyder, Emil, et al., "Soft Goals Can Be Compiled Away", Journal of Artificial Intelligence Research 36, pp. 547-556, (2009).

Cer, Daniel, "SemEval-2017 Task 1: Semantic Textual Similarity Multilingual and Cross-lingual Focused Evaluation", arXiv:1708.00055v1, Jul. 31, 2017.

Reimers, Nils, et al., "Sentence-BERT: Sentence Embeddings using Siamese BERT-Networks", Proceedings of the 2019 Conference on Empirical Methods in Natural Language Processing, arXiv:1908.10084v1, Aug. 27, 2019.

Lan, Zhenzhong, et al., "Albert: A Lite Bert for Self-Supervised Learning of Language Representations", ICLR 2020, arXiv:1909.11948v6, Feb. 9, 2020.

Zhang, Shuailiang, et al., "Semantics-Aware Inferential Network for Natural Language Understanding", arXiv:2004.13338v1, Apr. 28, 2020.

Zhang, Zhuosheng, et al., "Semantics-Aware BERT for Language Understanding", The 34th AAAI Conference on Artificial Intelligence, pp. 9628-9635, Feb. 2020.

Katz, Michael, et al., "Top-Quality Planning: Finding Practically Useful Sets of Best Plans" The 34th AAAI Conference on Artificial Intelligence, pp. 9900-9907, Apr. 2020.

Sohrabi, Shirin, et al., "An AI Planning Solution to Scenario Generation for Enterprise Risk Management", Proceedings of the 32nf AAAI Conference on Artificial Intelligence, pp. 160-167, (2018).

Katz, Michael, et a., "A Novel Iterative Approach to Top-k Planning", Proceedings of the 28th International Conference on Automated Planning and Scheduling, pp. 132-140, (2018).

Schoemaker, Paul J., "Scenario Planning: A Tool for Strategic Thinking", MIT Sloan Management Review, vol. 36, No. 2, Winter 1995.

Zeng, Daojian, et al., "Relation Classification via Convolutional Deep Neural Network", COLING 2014, 25h International Conference on Computational Linguistics, Proceedings of the Conference, pp. 2335-2344, Aug. 2014.

Deunietz, Jesse, et al., "DeepCx: A transition-based approach for shallow semantic parsing with complex constructional triggers", Proceedings of the 2018 Conference on Empirical Methods in Natural Language Processing, pp. 1691-1701, Oct. 2018.

CER,Daniel, et al., "Universal Sentence Encoder for English", Proceedings of the 2018 Conference on Empirical Methods in Natural Language Processing (System Demonstrations), pp. 169-174, Oct. 2018.

Reimers, Nils, et al., "Sentence-BERT: Sentence Embeddings using Siamese BERT-Networks", Proceedings of the 2019 Conference on Empirical Methods in Natural Language Processing and the 9th International Joint Conference on Natural Language Processing, pp. 3982-3992, Nov. 2019.

Edgar, Boo, et al., "Scenario Planning as a Tool to Promote Innovation in Regional Development Context", Technical Report (2014).

Mitra, Bhaskar, "An Introduction to Neural Information Retrieval", pp. 1-116(2018).

Dos Santos, Cicero N., et al., "Classifying Relations by Ranking with Convolutional Neural Networks", Proceedings of the 53rd Annual Meeting of the Association for Computational Linguistics and the 7th International Joint Conference on Natural Language Processing, pp. 626-634, Jul. 2015.

Lin, Yankai, et al., "Neural Relation Extraction with Selective Attention over Instances", Proceedings of the 54th Annual Meeting of the Association for Computational Linguistics, ACL 2016, Aug. 2016.

Peterson, Garry D., et al., "Scenario Planning: a Tool for Conservation in an Uncertain World", Conservation Biology 17(2), pp. 358-366, Apr. 2003.

Sohrabi, Shirin, et al., "Plan Recognition as Planning Revisited", Proceedings of the 25th International Joint Conference on Artificial Intelligence (IJCAI), pp. 3258-3264 (2016).

Speck, David, et al., "Symbolic Top-k Planning", Proceedings of the 34th AAAI Conference on Artificial Intelligence, pp. 9967-9974, Apr. 2020.

Speck, David, et al., "Symbolic Planning with Edge-Valued Multi-Valued Decision Diagrams", Proceedings of the 28th International Conference on Automated Planning and Scheduling (ICAPS), pp. 250-258, (2018).

Oliver, J., J., et al., "Managing future uncertainty: Re-evaluating the role of scenario planning", Business Horizons 61: 339-352, Mar. 2018.

Garvin et al., 'A Note on Scenario Planning', Harvard Business School Background Note 306-003, Jul. 31, 2006, 10 Pages.

* cited by examiner

METHOD AND SYSTEM FOR AUTOMATING SCENARIO PLANNING

BACKGROUND

One or more of the present embodiments relate to a scenario planning, and more specifically to an artificial intelligence based solution to automatically generated scenarios. More specifically, the present embodiments are directed at application of neural causal extraction techniques to derive hidden or non-apparent causal relations from one or more documents for scenario planning.

Scenario planning is a technique to facilitate strategic decision makings with developing long term plans. The key idea of scenario planning is to generate a variety of alternative futures, referred to as scenarios, for long term planning. Scenario planning involves uncovering a set of forces and their influences, trends, and effects amongst them, as well as selecting a subset of forces and using their value range as axis of the scenario space. Prior solutions incorporate or require manual creation of causal relations between all forces. Accordingly, there is a need for automated scenario planning that eliminates manual processes, and thereby mitigates or eliminates bias.

SUMMARY

The embodiments include a system, a computer program product, and a method for automating scenario planning. This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

In one aspect, a computer system is provided having a processor operatively coupled to memory, and an artificial intelligence (AI) platform operatively coupled to the processor. The AI platform includes one or more modules to support and enable automated scenario planning. The tools include a natural language (NL) module, a force module, a forces causal model (FCM) module, and a machine learning (ML) module. The NL module is configured to interpret a received NL issue requiring decision-making support and to identify a corpus of text related to the received NL issue. The force module is configured to derive a document set of forces associated with the identified corpus of text, which is leveraged or subject to leveraging by the FCM module configured to automatically construct an FCM. The ML module is configured to leverage the FCM to construct a general scenario planning (GSP) problem and provide a corresponding solution in the form of computation of one or more trajectories. A visual display is provided operatively coupled to the AI platform, to convey the solution.

In another aspect, a computer program product is provided with a computer readable storage medium or media, and program code stored on the computer readable storage medium or media. The program code is executable by a computer processor to support and enable automated scenario planning. Program code is provided to interpret a received natural language (NL) issue requiring decision-making support, identify a corpus of text related to the received NL issue, and derive a document set of forces associated with the identified corpus of text. Program code is further provided to leverage or subject to leveraging the document set of forces to automatically construct a forces causal model (FCM). In addition, program code is provided to leverage the FCM to construct a general scenario planning (GSP) problem and provide a corresponding solution in the form of computation of one or more trajectories. A visual display is provided operatively coupled to an artificial intelligence (AI) platform, to convey the solution.

In yet another aspect, a computer-implemented method is provided for supporting and enabling automated scenario planning. A natural language (NL) issue requiring decision-making support is received, a corpus of text related to the received NL issue is identified, and a document set of forces associated with the identified corpus of text is derived. The document set of forces are leveraged to automatically construct a forces casual model (FCM), and the FCM is then leveraged to construct a general scenario planning (GSP) problem. One or more trajectories are computed as a solution or solution set conveyed or otherwise communicated.

These and other features and advantages will become apparent from the following detailed description of the presently exemplary embodiment(s), taken in conjunction with the accompanying drawings.

BRIEF DESCRIPTION OF THE SEVERAL VIEWS OF THE DRAWINGS

The drawings referenced herein form a part of the specification and are incorporated herein by reference. Features shown in the drawings are meant as illustrative of only some embodiments, and not of all embodiments, unless otherwise explicitly indicated.

DETAILED DESCRIPTION

Figure 1:
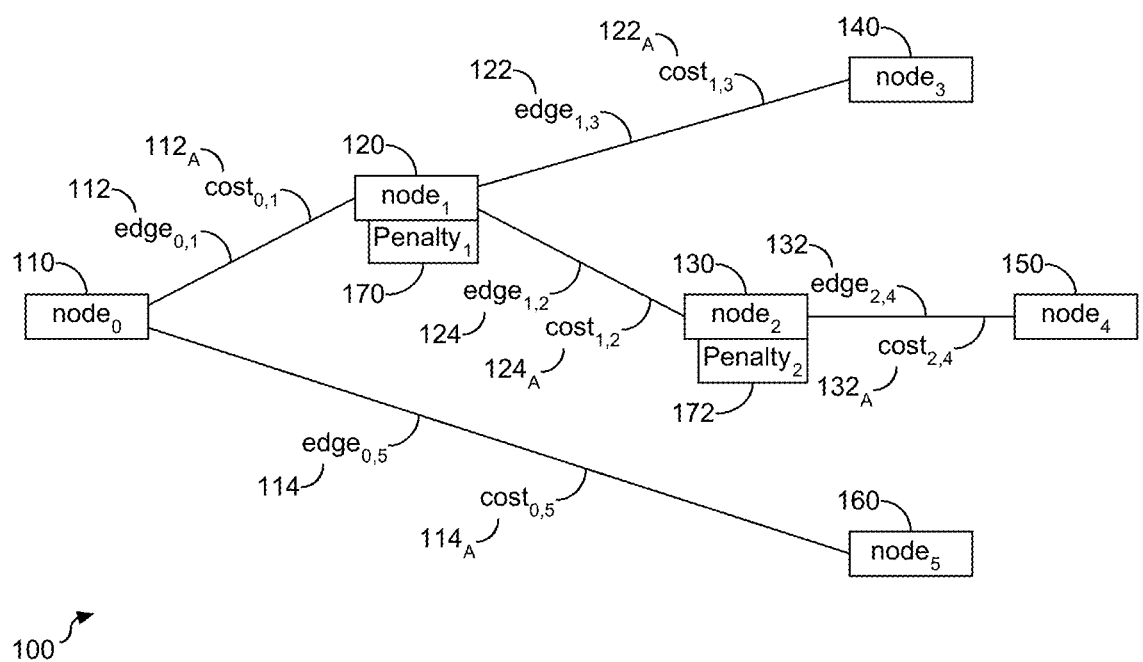
FIG. 1 depicts a block diagram illustrating an example of forces, their causal connections, costs, and penalties.

It will be readily understood that the components of the present embodiments, as generally described and illustrated in the Figures herein, may be arranged and designed in a wide variety of different configurations. Thus, the following detailed description of the exemplary embodiments of the apparatus, system, method, and computer program product, as presented in the Figures, is not intended to limit the scope of the embodiments, as claimed, but is merely representative of selected embodiments.

Reference throughout this specification to "a select embodiment," "one embodiment," "an exemplary embodiment," or "an embodiment" means that a particular feature, structure, or characteristic described in connection with the embodiment is included in at least one embodiment. Thus, appearances of the phrases "a select embodiment," "in one embodiment," "in an exemplary embodiment," or "in an embodiment" in various places throughout this specification are not necessarily referring to the same embodiment. The embodiments described herein may be combined with one another and modified to include features of one another. Furthermore, the described features, structures, or characteristics of the various embodiments may be combined and modified in any suitable manner.

The illustrated embodiments will be best understood by reference to the drawings, wherein like parts are designated by like numerals throughout. The following description is intended only by way of example, and simply illustrates certain selected embodiments of devices, systems, products, and processes that are consistent with the embodiments as claimed herein.

In the field of artificially intelligent computer systems, natural language systems (such as the IBM Watson® artificially intelligent computer system or other natural language systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content responses to the identification and understanding as well as changes to the structures are extremely difficult at a practical level.

Prior art scenario exploration captures domain knowledge with a manual process for modelling scenario planning. As shown and described herein, with support of access to a collection of documents, a process is provided for automating exploration of scenarios while mitigating or eliminating bias. The system, computer program product, and process shown and described herein, is directed at automated scenario planning. A neuro-symbolic artificial intelligence planning model derives causal relations between forces from a set of input documents to capture solutions to a scenario planning problem. Scenarios are derived from sets of plans for a corresponding planning problem. Neural techniques are employed to an existing collection of documents to produce a planning domain and a problems collection. The planning techniques are utilized to produce multiple plans. In an exemplary embodiment, performance of the top k plans are evaluated or otherwise compared in order to discover or otherwise narrow the scope of the produced plans.

Referring to FIG. 1, a block diagram (100) is provided to illustrate an example of forces, their causal connections, costs, and penalties. The forces are shown as nodes of a graph. In this example, there are six nodes, including $Node_0$ (110), $Node_1$ (120), $Node_2$ (130), $Node_3$ (140), $Node_4$ (150), and $Node_5$ (160). An edge extends between pairs of adjacent nodes. In this example of six nodes, there are five edges, including $Edge_{0,1}$ (112) extending between $Node_0$ (110) and $Node_1$ (120), $Edge_{0,5}$ (114) extending between $Node_0$ (110) and $Node_5$ (114), $Edge_{1,3}$ (122) extending between $Node_1$ (120) and $Node_3$ (140), $Edge_{1,2}$ (124) extending between $Node_1$ (120) and $Node_2$ (130), and $Edge_{2,4}$ (132) extending between $Node_2$ (130) and $Node_4$ (150). Each edge represents a pair of forces. As such, in the example shown herein there are five pairs of forces shown as $Edge_{0,1}$ (112), $Edge_{0,5}$ (114), $Edge_{1,3}$ (122), $Edge_{1,2}$ (124), and $Edge_{2,4}$ (132). Specifically, $Edge_{0,1}$ (112) is associated with $cost_{0,1}$ ($112_A$), $Edge_{0,5}$ (114) is associated with $cost_{0,5}$ ($114_A$), $Edge_{1,3}$ (122) is associated with $cost_{1,3}$ ($122_A$), $Edge_{1,2}$ (124) is associated with $cost_{1,2}$ ($124_A$), and $Edge_{2,4}$ (132) is associated with $cost_{2,4}$ ($132_A$). Details of the cost(s) are shown and described below. Penalties are associated with the internal nodes, e.g. $Node_1$ (120) and $Node_2$ (130). By way of example, $Node_1$ (120) is shown with $penalty_1$ (170) and $Node_2$ (130) is shown $penalty_2$ (172), with each individual penalty quantifying a corresponding assessment for not traversing the corresponding node.

In the example shown in FIG. 1, the initial force is represented at $Node_0$ (110), and implications are shown at $Node_3$ (140), $Node_4$ (150), and $Node_5$ (160), with each of $Node_3$ (140), $Node_4$ (150), and $Node_5$ (160) representing separate implications. A valid trajectory corresponds to a path from the initial force, e.g. $Node_0$ (110), to one of the implications, e.g. one of $Node_3$ (140), $Node_4$ (150), or $Node_5$ (160). The cost of starting a traversal in the initial force represented at $Node_0$ (110) is zero. In an exemplary embodiment, the traversal costs are cumulative. For example, a trajectory of $Node_0$ (110)→$Node_1$ (120)→$Node_2$ (130)→, $Node_3$ (140) has a cost represented as $cost_{0,1}$ ($112_A$)+$cost_{1,2}$ ($124_A$)+$cost_{2,4}$ (132). Accordingly, each traversal path has a corresponding cost as a cumulative value corresponding to the edges represented in the trajectory.

A detailed discussion of definitions and concepts useful for understanding the operation of scenario planning are described. Scenario planning for a risk management problem can be represented based on the definitions of a forces causal model (FCM), general scenario planning (GSP), and a solution to a GSP over forces, F. The FCM is defined as a pair $\langle F, I \rangle$, where F represents possible forces, and I is a function mapping from a pair of forces to a vector of real values, I (a,b), that describe the properties of a causing b. By way of the example shown in FIG. 1, the forces are represented as the nodes of the graph with $Node_0$ (110) representing $Force_0$, $Node_1$ (120) representing $Force_1$, $Node_2$ (130) representing $Force_2$, $Node_3$ (140) representing $Force_3$, Node$_4$ (150) representing Force$_4$, and Node$_5$ (160) representing Force$_1$. The mapping of the pair of forces, I is defined as $F \times F \to (\mathbb{R}^{0+})^n$. Some example properties are likelihood of a causing b, an impact of a causing b, or a confidence provided by a particular tool that a is causing b.

Given the definition of the FCM, a general scenario planning problem (GSP) is defined as a tuple, $G = \langle M, F_0, F_*; F_o, F_s \rangle$, where M is an FCM, $F_0 \subseteq F$ is a set of initial forces, $F_* \subseteq F$ is a set of implications, $F_o \subseteq F$ is a set of selected forces, and $F_s \subseteq F$ is a set of indicators. Semantically, $F_0$ are the forces from which an exploration starts, and $F_*$ are the forces to which an exploration leads. The forces in $F_o$ describe a current situation, and the forces $F_s$ describe those of possible interest. By way of the example shown in FIG. 1, the initial force, e.g. Force$_0$, represented as Node$_0$ (110) is an indicator, and the internal nodes, e.g. Node$_1$ (120) and Node$_2$ (130) represent selected forces, and Node$_3$ (140), Node$_4$ (150), and Node$_5$ (160) represent implication forces. In an exemplary embodiment, given a forces model and forces impact, a corresponding FCM can be defined.

A solution for the GSP is defined in a manner directed at automating a process of generating scenarios. More specifically, the solution, $\Phi$, to a GSP over forces, F, is a set of valid trajectories, $\phi$. A trajectory is considered valid if it starts in the set of initial forces, $F_0$, and ends in the forces to which the exploration leads, $F_*$. In an exemplary embodiment, the quantity of trajectories is defined as $|\Phi|$. Similarly, in an embodiment, the set of valid trajectories, $\phi$, may refer to sequence of pairs of forces. Each trajectory $\phi \in \Phi$ traverses a subset of selected forces, denoted by $F_o^\Phi$, as well as a subset of indicators, denoted by $F_s^\Phi$. In an exemplary embodiment, the solution for the GSP may be partitioned into one or more scenarios. Different parameters for partitioning may be defined, such as but not limited to, partitioning based on traversed indicator, and partitioning based on sets of all forces traversed.

A penalty, p, quantifies not traversing a selected force. With respect to the definitions provided, a mapping of penalty $p_o: F_o \longmapsto \mathbb{R}^+$. Similarly, a cost, c, quantifies a traversal. With respect to the definitions provided, a cost $c_0: F_o \longmapsto \mathbb{R}^+$, which is directed at starting a traversal in a particular initial force, represented by way of example as Node$_0$ (110). For a valid trajectory, $\phi$, the costs is denoted as $c_0(\phi)$. It is understood that among a valid collection of trajectories, each trajectory is a solution, and the collection of trajectories represent a collection of solutions. In an exemplary embodiment, such a collection of solutions are bounded to minimize the penalty for each trajectory.

Figure 2A:
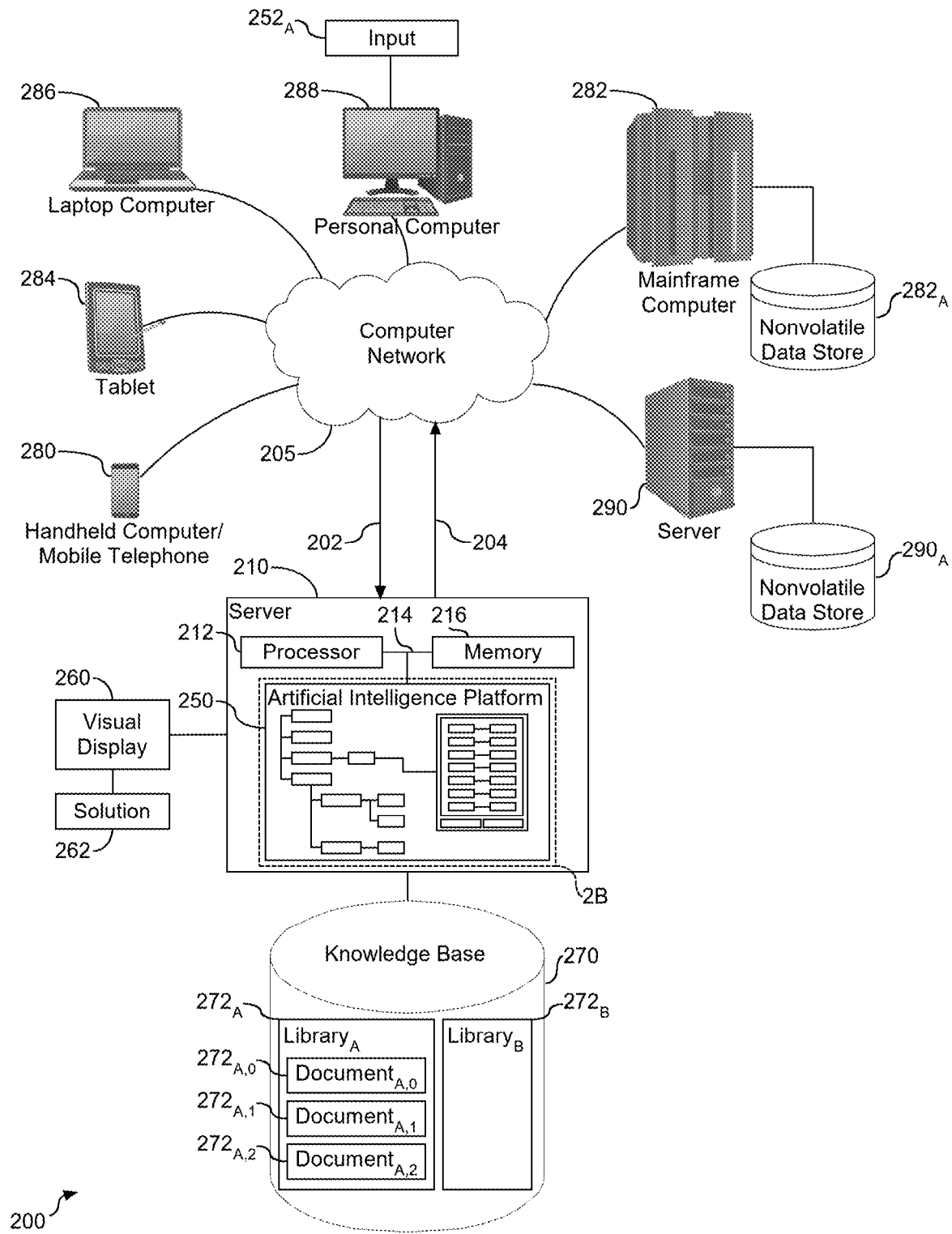
FIGS. 2A and 2B depict a block diagram illustrating an artificial intelligence (AI) platform and corresponding system.
Figure 2B:
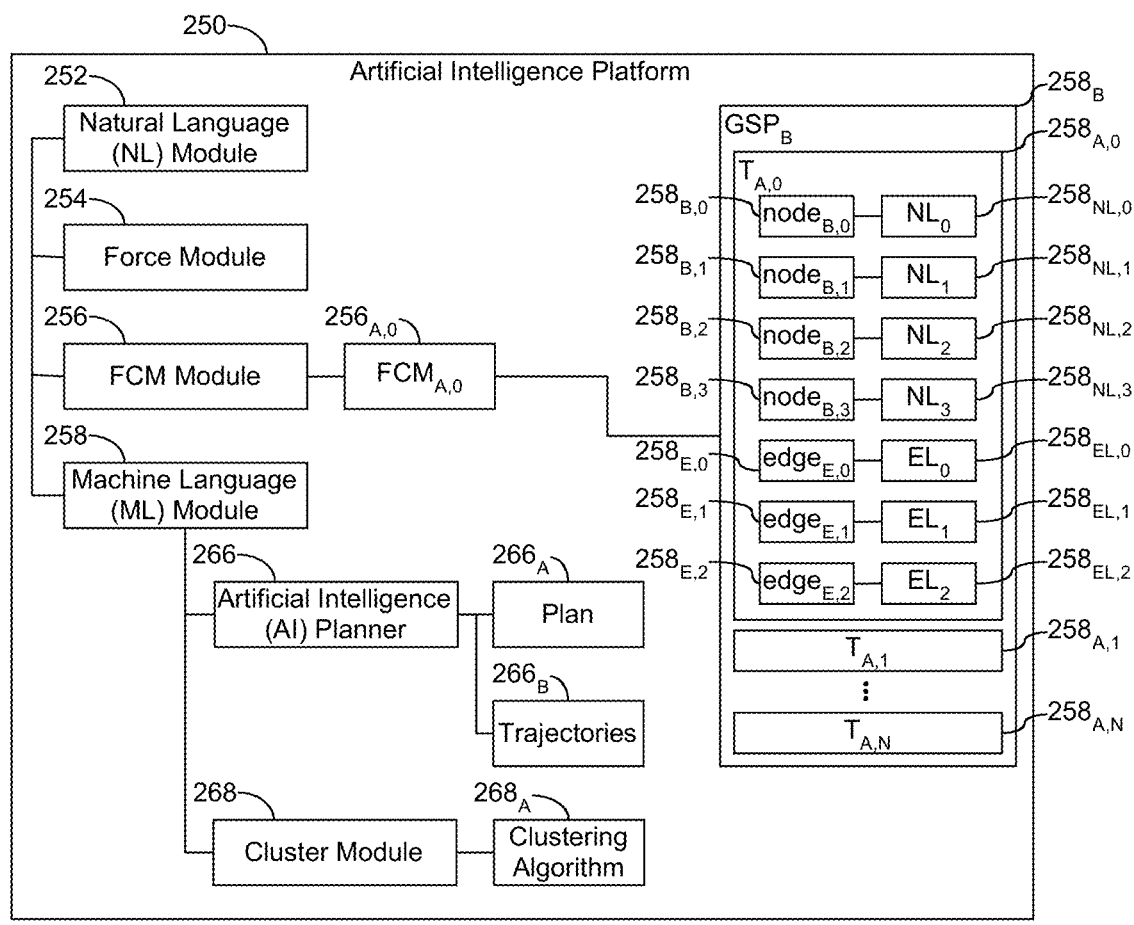

As shown and described herein, an automated artificial neural system, computer program product, and method are provided to derive FCMs. Referring to FIGS. 2A and 2B, a block diagram of an artificial intelligence (AI) platform and corresponding system (200) is depicted. As shown, a server (210) is provided in communication with a plurality of computing devices (280), (282), (284), (286), (288), and (290) across a network connection, e.g. computer network, (205). The server (210) is configured with a processing unit (212), e.g., a processor, in communication with memory (216) across a bus (214). The server (210) is shown with an AI platform (250) operatively coupled to a visual display (260) and an associated knowledge base (270), e.g. data source. Details of the AI platform (250) are shown and described in FIG. 2B. The computing devices (280), (282), (284), (286), (288), and (290) may be provided with a visual display, audio interface, an audio-video interface, or other types of interfaces to convey a general scenario planning.

The AI platform (250) is operatively coupled to the network (205) to support decision-making based corresponding to natural language processing (NLP). The computing devices (280), (282), (284), (286), (288), and (290) communicate with each other and with other devices or components via one or more wired and/or wireless data communication links, where each communication link may comprise one or more of wires, routers, switches, transmitters, receivers, or the like. In this networked arrangement, the server (210) and the network connection (205) enable communication detection, recognition, and resolution. Other embodiments of the server (210) may be used with components, systems, sub-systems, and/or devices other than those that are depicted herein.

The AI platform (250) is also shown herein operatively coupled to the knowledge base (270), also referred to herein as a corpus of information. As shown, the knowledge base (270) is configured with a plurality of libraries, shown herein by way of example as Library$_A$ (272$_A$) and Library$_B$ (272$_B$). While two libraries are shown in FIG. 2A, it should be understood that the knowledge base (270) may include fewer or more libraries. Further, the libraries, e.g. Library$_A$ (272$_A$) and Library$_B$ (272$_B$) may be combined together. The libraries, Library$_A$ (272$_A$) and Library$_B$ (272$_B$), may exist across a plurality of knowledge domains, including knowledge base (270) and other knowledge domains (not shown). Each library is populated with data, such as documents and other forms of textual data, either in a structured or unstructured form. By way of example, Library$_A$ (272$_A$) is populated with documents represented as document$_{A,0}$ (272$_{A,0}$), document$_{A,1}$ (272$_{A,1}$), and document$_{A,2}$ (272$_{A,2}$). Library$_B$ (272$_B$) is similarly populated with textual based documents (not shown). The quantity of documents and libraries shown and described herein are for exemplary purposes and should not be considered limiting.

The AI platform (250) is shown herein with a plurality of tools to support construction of a forces causal model, construction of a general scenario planning (GSP) problem, and presentation of conveyance of a solution to the GSP problem. The AI platform (250) is configured to support and enable receipt of input or input data from one or more of the computing devices (280), (282), (284), (286), (288), and (290) across the network connection (205). In an exemplary embodiment, the received input is natural language (NL) text or audio converted to NL text, with the input directed at an issue requiring decision-making. As shown herein, the AI platform (250) is configured with modules to support computation of trajectories as a solution to the GSP corresponding to the received input. The tools include a NL module (252), a force module (254), a forces causal model (FCM) module (256), and a machine learning (ML) module (258).

The NL module (252) is configured to receive and interpret input in the form of subjecting textual data to natural language processing (NLP) or subjecting audio data to NL conversion, and subjecting the converted NL to NLP. In an exemplary embodiment, input is received across the communication link (205), with the input being in the form of one or more phrases that define one or more events or conditions that require decision-making. The NL module (252) leverages the NL data, e.g. input, to conduct an initial processing and interpretation thereof to identify a corpus or library of text or documents to support decision-making. In an embodiment, the NL module (252) automatically extracts the input, e.g. one or more phrases, from an input source, such as one or more of the computing devices (280), (282), (284), (286), (288), and (290) that are operatively coupled to the server (210). In an exemplary embodiment, the NL module (252) leverages the knowledge base (270) and the libraries therein, e.g. such as Library$_A$ (272$_A$) and Library$_B$ (272$_B$). Similarly, in an embodiment, the NL module (252) may leverage a corpus or library of text or documents across the network connection (205). The corpus or library identification is directed at a decision making inquiry corresponding to the received and interpreted input. Accordingly, the initial aspect of decision making is directed at NLP and a corresponding corpus or library identification as related to the NL input is interpreted.

As shown herein, the force module (254) is operatively coupled to the NL module (152). After the library or corpus is identified, the force module (254) processes text in the identified library or corpus, and derives a document set of forces as related to the inquiry. The aspect of deriving the forces includes the force module (254) to automatically derive forces in the form of an initial set of forces, a set of implication forms, a set of selected forces, and a set of indicator forces from the identified library or corpus of documents. Details of the derivation of the document set of forces is shown and described in FIG. 4. The FCM module (256) leverages the document set of forces and constructs a corresponding FCM. By way of example, FCM$_{A,0}$ (256$_{A,0}$) is shown herein operatively coupled to the FCM module (256). Details and the process of constructing the FCM are shown and described in FIG. 5. Accordingly, the document set of forces are derived and leveraged to generate the FCM.

The ML module (258) is shown herein operatively coupled to the FCM module (256). The ML module (258) leverages the FCM, e.g. FCM$_{A,0}$ (256$_{A,0}$), and the forces therein, to construct a general scenario planning (GSP) problem and to provide a solution to the GSP problem, with the provided solution including computation of one or more trajectories. More specifically, the ML module (258) defines the GSP problem based on the FCM and the derived set of initial forces, set of implication forces, set of selected forces, and the set of indicator forces. As shown herein, an AI planner (266) is shown herein operatively coupled to the ML module. The AI planner (266) is provided to generate a planning task with output in the form of a set of plans from which the one or more trajectories are computed. By way of example, the set of plans (266$_A$) is shown herein as generated by the AI planner (266), and the computed one or more trajectories (266$_B$) is shown herein operatively coupled to the plans (266$_A$). Each of the computed trajectories is a sequence of forces. By way of example, a GSP problem, GSP$_B$ (258$_B$) is shown herein as corresponding to FCM$_{A,0}$ (256$_{A,0}$), with associated trajectories shown herein as T$_{A,0}$ (258$_{A,0}$), T$_{A,1}$ (258$_{A,1}$), . . . , (T$_{A,N}$ (258$_{A,N}$). The quantity of trajectories shown and described herein is for exemplary purposes and should not be considered limiting. In an exemplary embodiment, a smaller or larger quantity of trajectories may be computed as a solution to GSP$_B$ (258$_B$). The generated one or more trajectories, e.g. T$_{A,0}$(258$_{A,0}$), T$_{A,1}$ (258$_{A,1}$), . . . , T$_{A,N}$ (258$_{A,N}$), may be in the form or format of a graph diagram that contains nodes and edges, and where each node represents a condition or event and each corresponding edge between two nodes indicates or otherwise conveys a causal relationship between two nodes. An example graph diagram is shown and described in FIG. 1. The solution and the generated trajectories correspond to the corpus or library of text or documents to support decision-making.

In an exemplary embodiment, the quantity of trajectories generated as the solution to the GSP may be excessive. To address this scenario, a cluster module (268) is provided. As shown, the cluster module (268) is embedded in the AI platform (250) and operatively coupled to the ML module (258). The cluster module (268) leverages a clustering algorithm, shown herein by way of example as (268$_A$), to cluster the trajectories. In an exemplary embodiment, the cluster module (268) selects an appropriate clustering algorithm from a selection of such algorithms. Similarly, in an embodiment, a trajectory threshold is applied to activate the cluster module (268), such that the clustering algorithm is selectively invoked in response to a quantity of trajectories either meeting or exceeding the trajectory threshold. In an embodiment, the trajectory threshold is a configurable value. Accordingly, the clustering algorithm functions to facilitate grouping of the trajectories in select circumstances.

Generating the solution and corresponding trajectories may be selectively enhanced by providing or otherwise enabling a corresponding explanation and documentation. More specifically, the ML module (258) is configured to embed a link between the generated nodes and edge(s) in the trajectory to one or more documents in the identified corpus or library, with the link serving as a tool to provide an explanation for each node and edge in the generated trajectory by. By way of example, trajectory T$_{A,0}$ (258$_{A,0}$) includes four nodes, shown herein as node$_{B,0}$ (258$_{B,0}$), node$_{B,1}$ (258$_{B,1}$), node$_{B,2}$ (258$_{B,2}$) and node$_{B,3}$ (258$_{B,3}$) and three edges, shown herein as edge$_{E,0}$ (258$_{E,0}$), edge$_{E,1}$ (258$_{E,1}$), and edge$_{E,2}$ (258$_{E,2}$). Each of the nodes has a corresponding link, referred to herein as a node-link, and shown herein as NL$_0$ (258$_{NL,0}$), NL$_1$ (258$_{NL,1}$), NL$_2$ (258$_{NL,2}$) and NL$_3$ (258$_{NL,3}$) Similarly, each of the edges has a corresponding link edge link, referred to herein as an edge-link, e.g. EL, shown herein as EL$_0$ (258$_{EL,0}$), EL$_1$ (258$_{EL,1}$), and EL$_2$ (258$_{EL,2}$). Both the node links and the edge links represent a connection from the graph diagram to one or more documents in one or more of the corresponding libraries. By way of example, the NL module (252) identified Library$_A$ (272$_A$), and the node links and edge links are directed to one or more of the documents in the identified library, e.g. document$_{A,0}$ (272$_{A,0}$), document$_{A,1}$ (272$_{A,1}$), and document$_{A,2}$ (272$_{A,2}$).

In an exemplary embodiment, the trajectories, shown herein as T$_{A,0}$ (258$_{A,0}$), T$_{A,1}$ (258$_{A,1}$), . . . , and T$_{A,N}$ (258$_{A,N}$), are conveyed or presented on the visual display (260) as the solution (262) to the GSP problem, GSP$_B$ (258$_B$). Similarly, in an embodiment, the solution (262) may be communicated across the network connection (205) to one or more of the computing devices (280), (282), (284), (286), (288), and (290), and following receipt may be conveyed on a corresponding visual display.

The AI platform (250) is configured to receive input (202) from various sources across the network (205). For example, in an exemplary embodiment, the AI platform (250) may be configured with or operatively coupled to a dialog system (not shown) to receive input across the network (205) and leverage one of the libraries, corpus of document, or a knowledge domain to construct a GSP problems and compute one or more trajectories as a solution to the GSP problem. The created output or response content may be returned as output (204) across the computer network (205) to the same source and/or another source or sources.

The various computing devices (280), (282), (284), (286), (288), and (290) in communication with the network (205) may include access points to the server (210). The network (205) may include local network connections and remote connections in various embodiments, such that the AI platform (250) may operate in environments of any size, including local and global, e.g., the Internet. Additionally, the AI platform (250) serves as a back-end system that can make available a variety of knowledge extracted from or represented in documents, network accessible sources and/or structured data sources. In this manner, some processes populate the AI platform (250), with the AI platform (250) also including input interfaces to receive requests and respond accordingly.

The AI platform (250) and corresponding modules (252), (254), (256), (258), (266), and (268) may be processed or otherwise enabled and supported by the IBM Watson® server (210). In some illustrative embodiments, server (210) may be the IBM Watson® system available from International Business Machines Corporation of Armonk, New York, augmented with the mechanisms of the illustrative embodiments described hereafter.

The NL module (252), the force module (254), the FCM module (256), the ML module (258), the AI Planner (266), and the cluster module (268), hereinafter referred to collectively as AI tools, are shown as being embodied in or integrated within the AI platform (250) of the server (210). The AI tools may be implemented in a separate computing system (e.g., 290) that is connected across network (205) to the server (210). Wherever embodied, the AI tools function to: interpret a decision-making issue, derive a document set of forces, construct an FCM, and leverage the FCM to construct a GSP and provides a solution to the GSP.

Types of information handling systems that can utilize the artificial intelligence platform (250) range from small handheld devices, such as handheld computer/mobile telephone (280) to large mainframe systems, such as mainframe computer (282). Examples of handheld computer (280) include personal digital assistants (PDAs), personal entertainment devices, such as MP4 players, portable televisions, and compact disc players. Other examples of information handling systems include pen, or tablet computer (284), laptop, or notebook computer (286), personal computer system (288), and server (290). As shown, the various information handling systems can be networked together using computer network (205). Types of computer network (205) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (290) utilizes nonvolatile data store ($290_A$), and mainframe computer (282) utilizes nonvolatile data store ($282_A$). The nonvolatile data store ($282_A$) can be a component that is external to the various information handling systems or can be internal to one of the information handling systems.

The information handling system employed to support the AI platform (250) may take many forms, some of which are shown in FIG. 2A. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
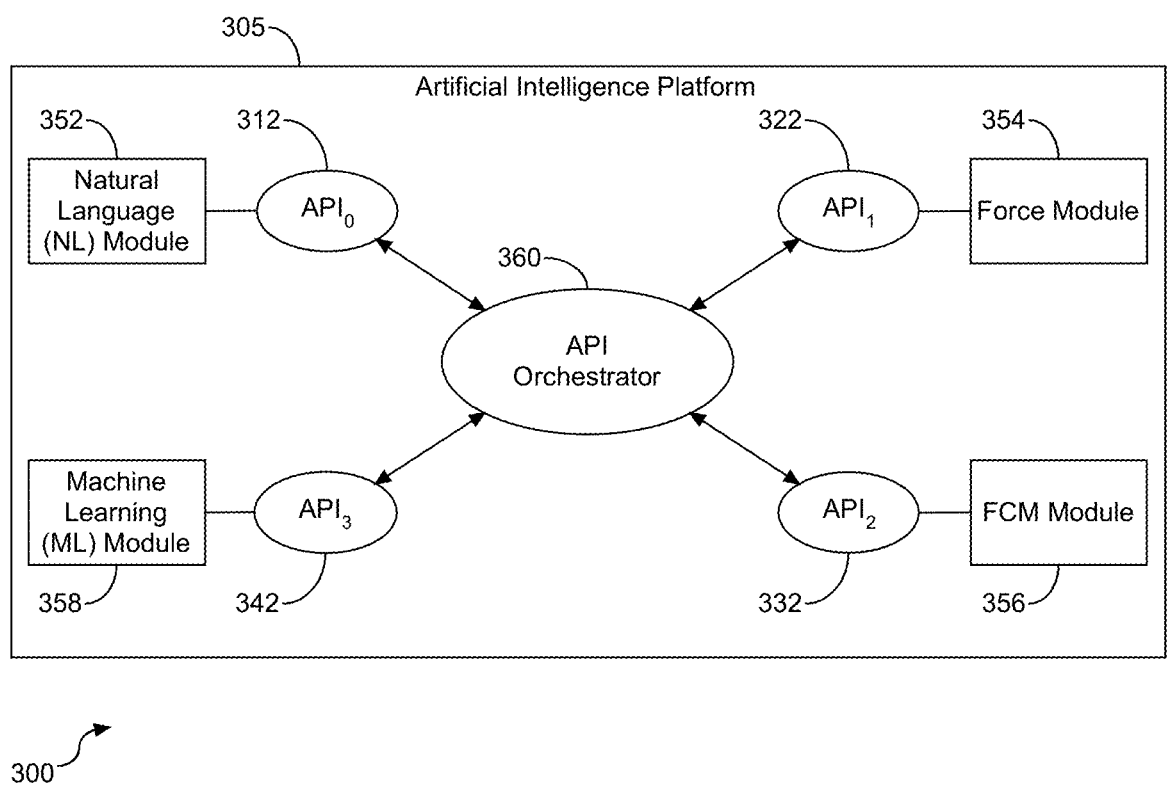
FIG. 3 depicts the artificial intelligence platform tools, as shown and described in FIGS. 2A and 2B, and their associated application program interfaces.

An Application Program Interface (API) is understood in the art as a software intermediary between two or more applications. With respect to the artificial intelligence platform (250) shown and described in FIG. 2B, one or more APIs may be utilized to support one or more of the tools (252), (254), (256), (258), (266), and (268) and their associated functionality. Referring to FIG. 3, a block diagram (300) is provided illustrating the tools (352), (354), (356), and (358) and their associated APIs. In an embodiment, the AI planner (266) and the cluster module (268) are supported by the ML module (358) and the corresponding or associated API. Similarly, in an exemplary embodiment, the AI planner (266) and cluster module (268) may be supported with separate APIs. As shown, a plurality of tools are embedded within the AI platform (305), with the tools including the NL module (352) associated with $API_0$ (312), the force module (354) associated with $API_1$ (322), the FCM module (356) associated with $API_2$ (332), the ML module (358) associated with $API_3$ (342). In an embodiment, the AI planner (266) and the cluster module (268) are supported by the ML module (358) and the corresponding or associated API. Similarly, in an exemplary embodiment, the AI planner (266) and cluster module (268) may be supported with separate APIs. Each of the APIs may be implemented in one or more languages and interface specifications. $API_0$ (312) provides functional support to interpret a received or detected NL issue requiring decision-making, and identification of a corpus or library of related text or textual content; $API_1$ (322) provides functional support to derive a set of forces associated with the identified corpus or library of text or textual content; $API_2$ (332) provides functional support to automatically construct an FCM that corresponds to the derived forces; and $API_3$ (342) provides functional support to leverage the FCM to construct a corresponding GSP problem and provide a solution to the GSP problem in the form of computing one or more trajectories.

As shown, each of the APIs (312), (322), (332), and (342) are operatively coupled to an API orchestrator (360), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 4:
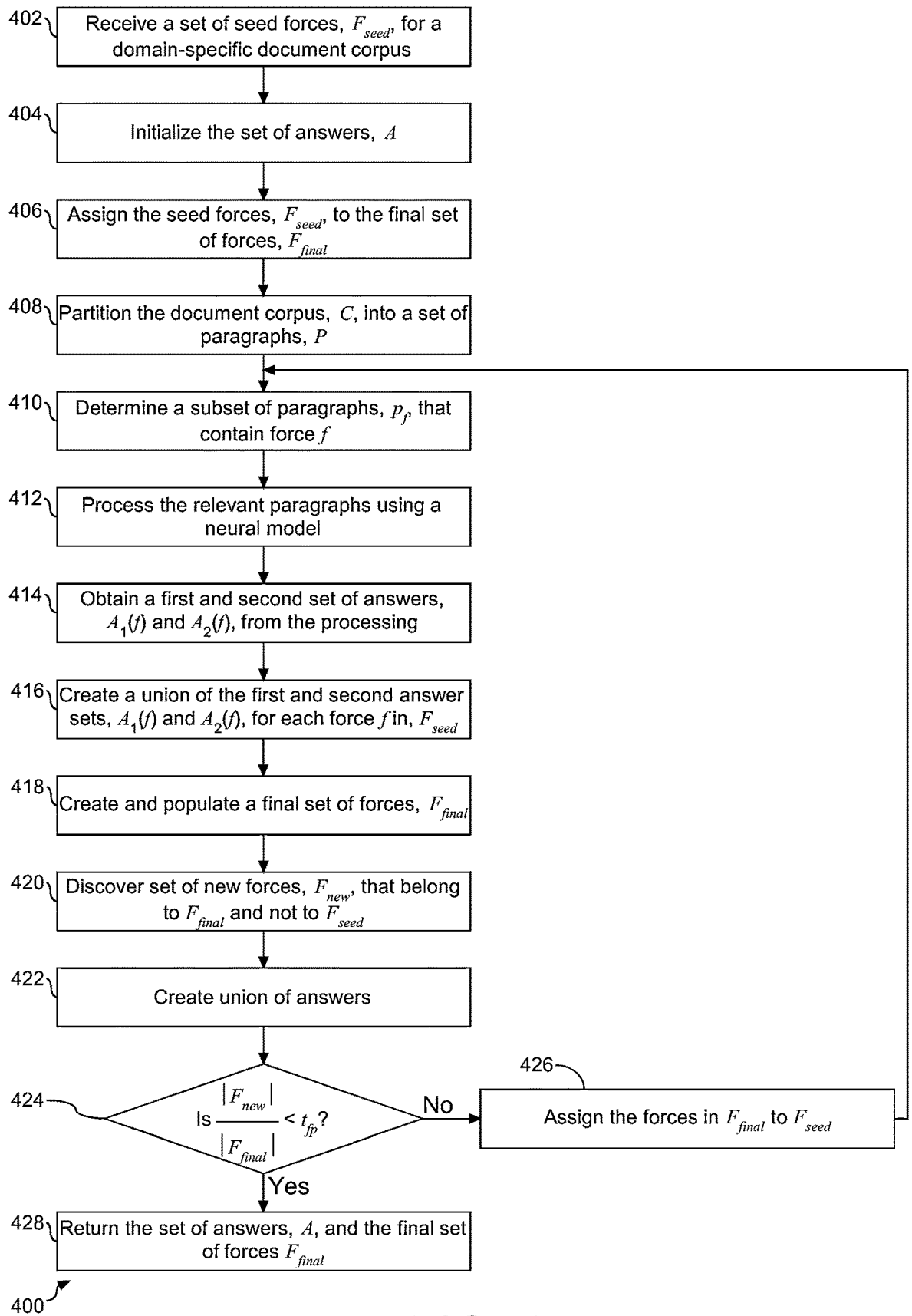
FIG. 4 depicts a flowchart illustrating a process of a method of leveraging natural language processing (NLP) to generate a set of forces, $F_{final}$ and answers, A.

Referring to FIG. 4, a flow chart (400) is provided to illustrate a process for leveraging natural language processing to generate a set of forces, $F_{final}$ and answers, A. A set of seed forces, $F_{seed}$, are provided or otherwise received for a domain-specific document corpus, C, (402). In an embodiment, it is understood that the users can often provide some key factors important to their domain for scenario planning, and as such the user(s) can have access to the sources relevant to those factors, specifying scenarios and risks in natural language. As shown and described herein, the FCMs are generated by distilling the problem into causal relation extraction over the document corpus, C, using the seed forces, $F_{seed}$, as the starting points. The set of answers, A, is initialized (404), and the final set of forces, $F_{final}$, is assigned the seed forces, $F_{seed}$, (406). The document corpus, C, is partitioned into a set of paragraphs, P, (408). For each force, f, in the seed forces, $F_{seed}$, a subset of paragraphs, $p_f$, in the set of paragraphs, P, that contain or refer to force f, are determined (410). The paragraph selection process shown in step (410) is implemented as a semantic search task, with a set of search results for each $F_{seed}$. In an exemplary embodiment, each paragraph, p, in each document in the corpus is embedded in one or more neural models for sentence embeddings.

Following step (410), two questions are processed over relevant paragraphs in the corpus using a neural model (412), also referred to herein as a question answering model, including: what does each force, f, in $F_{seed}$ cause? and what causes each force, f, in $F_{seed}$? Processing these two questions for each force, f, in $F_{seed}$ against each paragraph in the set of paragraphs results in a set of answers, which in an embodiment may be an empty set (414). As shown at step (414), a first set of answers for each force, $A_1(f)$ is obtained in response to the question "what does each force, f, in $F_{seed}$ cause?" and a second set of answers for each force $A_2(f)$ is obtained in response to the question "what causes each force, f, in $F_{seed}$?". In an embodiment, each of the first and second set of answers has a correspondence confidence value, c, where $c \in (0,1)$. Similarly, in an exemplary embodiment, each of the answer sets, $A_1(f)$ and $A_2(f)$, is limited to entries with a confidence value that exceeds a minimal threshold. A union of the first and second answer sets, $A_1(f)$ and $A_2(f)$, is created for each force, f, in $F_{seed}$ (416) in this iteration. In addition, a final set of forces, $F_{final}$, is created and populated with all the forces in the union of the answer sets, A, for the current iteration (418). Thereafter, a set of new discovered forces, $F_{new}$, as forces that belong to, $F_{final}$, and not to $F_{seed}$, logically expressed as $F_{new} \leftarrow F_{final} \backslash F_{seed}$, (420), and a union of the answers in the form of first and second answers sets created at step (416) and the set of answers from step (406) is created and set as the set of answers (422). The discovered new forces, $F_{new}$, can then be incorporated into the seed set for the next iteration. Accordingly, a set of new forces, $F_{new}$, and a set of answers, A, is created for each iteration.

The final set of forces, $F_{final}$, of an iteration is in turn provided as the seed set of forces for the next iteration, until a fixed point is received. As shown, following step (422), a fixed point assessment is conducted (424). In the example embodiment shown herein, the assessment evaluates a ratio of $F_{new}$ and $F_{final}$ with respect to a threshold, $t_{fp}$. Mathematically, the assessment is as follows:

$$\frac{|F_{new}|}{|F_{final}|} < t_{fp}$$

In an exemplary embodiment, the threshold, $t_{fp}$, is configurable. A negative response to the assessment is followed by assigning the forces in $F_{final}$ to the variable $F_{seed}$ (426) and a return to step (410) for the next iteration. Conversely, a positive response to the assessment is an indication that a fixed point has been reached, and the set of answers, A and the final set of forces, $F_{final}$, are returned (428). Accordingly, as shown herein, the iteration over the questions and answers is conducted until the quantity of new forces falls below a certain threshold.

Figure 5:
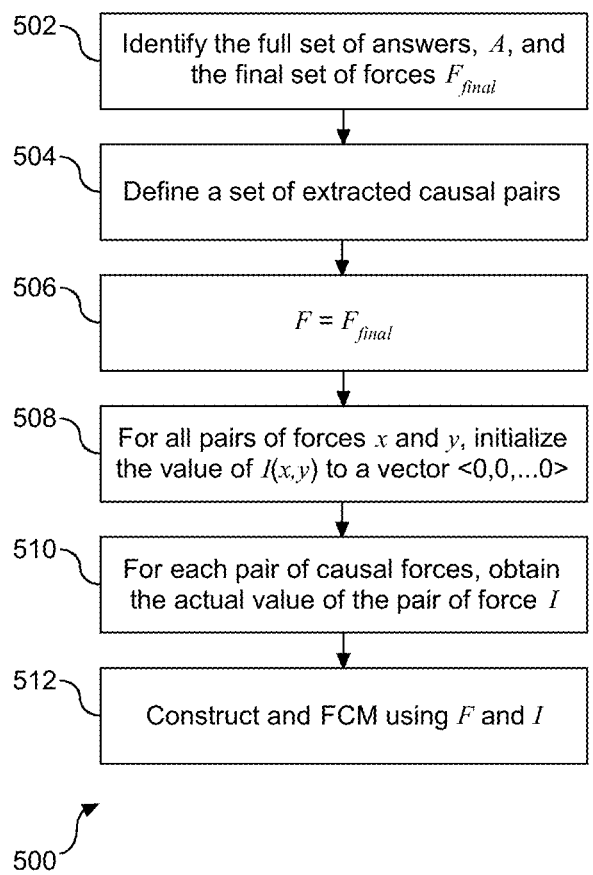
FIG. 5 depicts a flowchart illustrating an embodiment of a method of a process for generating a forces causal model (FCM).

Referring to FIG. 5, a flow chart (500) is provided to illustrate a process for generating the FCM. There are two elements in the FCM including the set of forces F and the mapping of the pair of forces I. The set of forces F is $F_{final}$ from step (428) of FIG. 4. The mapping of the pair of forces I involves a subject matter expert (SME), and in an exemplary embodiment involves taking the answers from the output of FIG. 4 and presenting them to an SME. As shown herein, the final set of forces, $F_{final}$, and the full set of answers, A, are identified (502). A set of extracted causal pairs is defined as:

$\varepsilon \leftarrow \{(x,y) | \exists (x,y,c) \in A\}$ (504), where x and y are extracted from corresponding text using natural language processing, and c is a function value. The set of final forces, $F_{final}$, is assigned to the variable F (506). For all pairs of forces x and y in the FCM, the value of I (x,y) is initialized to a vector <0, 0, ..., 0> (508). In an embodiment, the values of likelihood, impact, and duration are each represented with a numeric value, and are subject to initialization at step (508). Similarly, in an exemplary embodiment, there may be additional values from that of likelihood, impact, and duration, and as such, the quantity of causal pairs should not be considered limiting. Accordingly, as shown herein, the initialization of the causal pairs ensures that I is a proper function, e.g. has a value, for any pairs of forces.

For each pair of causal forces, the actual value of I is obtained (510). As shown herein, there are different embodiments in which the actual value of I is obtained. In an embodiment, a subset of the values I (x,y) may be elicited from experts through crowdsourcing. For example, questions about likelihood, impact, and duration of the extracted causal relationship may be elicited from one or more subject matter experts. In another embodiment, and as shown herein, the confidence scores of each pair, e.g. I (x,y), may be computed as an aggregate of confidence scores, such as the maximum or average confidence score. In an exemplary embodiment, the cost function, c, can be automatically generated for auto-generated FCMs based on the quantity of support statements that were used to derive a specific edge. Similarly, in an embodiment, a function, such as sigmoid and possibly with rounding, may be employed to map a frequency distribution into the cost function, c. The set of force, F, are known from FIG. 4, and following step (510), the function I has been constructed. Using F and I, an FCM is constructed (512). Accordingly, as shown herein, there are two elements in the FCM, the set of forces F and I, where I involves taking answers from the question answering model, and in an embodiment asking experts.

Figure 6:
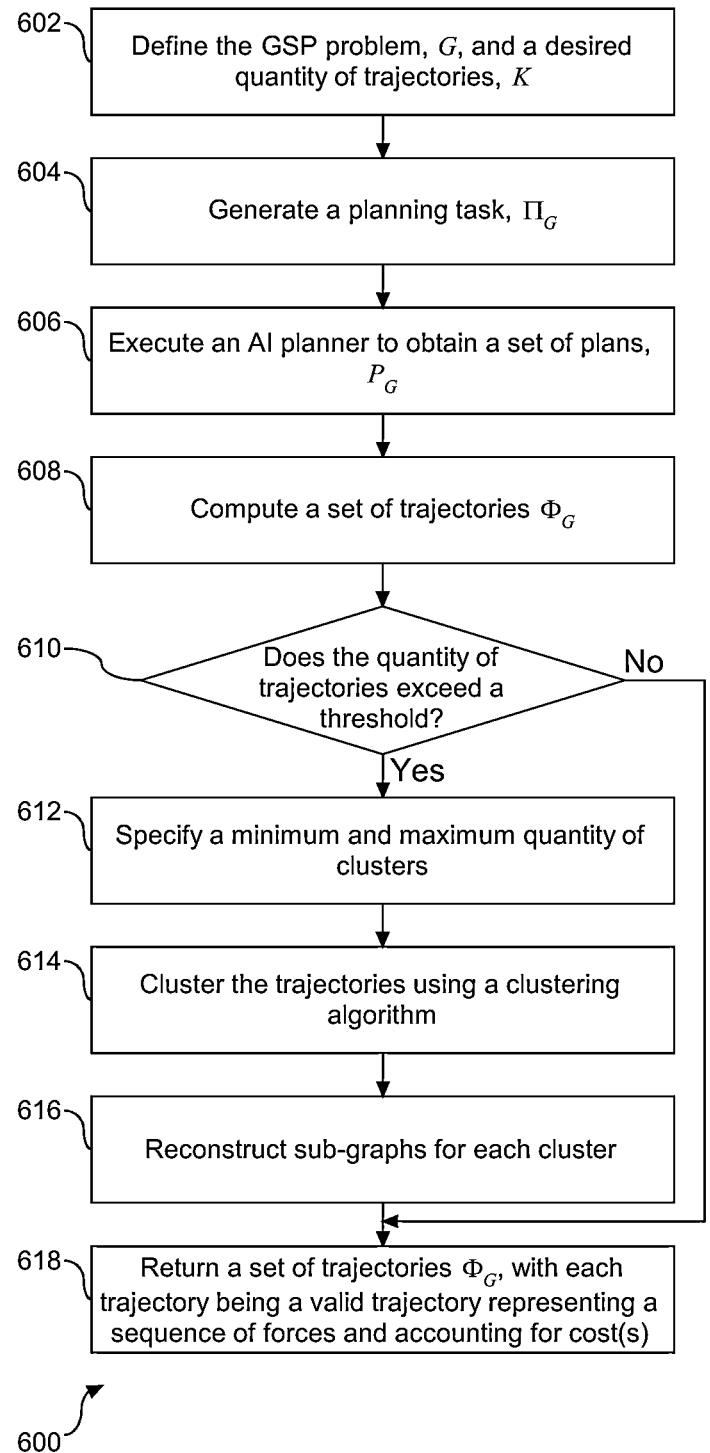
FIG. 6 depicts a flowchart illustrating an embodiment of a method of constructing a scenario planning problem from the FCM as generated in FIG. 5.

Referring to FIG. 6, a flow chart (600) is provided to illustrate a process for constructing a scenario planning problem from the FCM as generated in FIG. 5. As shown and described in FIG. 1, given the definition of the FCM, a general scenario planning problem (GSP) is defined as a tuple, $G = \langle M, F_0, F_*; F_o, F_s \rangle$, where M is an FCM, $F_0 \subseteq F$ is a set of initial forces, $F_* \subseteq F$ is a set of implications, $F_o \subseteq F$ is a set of selected forces, and $F_s \subseteq F$ is a set of indicators. The FCM, M, is generated in FIG. 4 from the output of the question answer process.

Once the FCM, M is obtained the following sets and functions are specified to construct the GSP: initial forces and implications, selected forces and indicators, and cost function. The set of initial forces, $F_0$, and the set of implications, $F_*$, are the forces that start and end valid trajectories. In an exemplary embodiment, input is solicited to specify with the set of initial forces or the set of implications, and the non-solicited set is automatically computed. In scenario planning applications, the set of initial forces, $F_0$, are automatically computed as a set of forces such that every force in F is reachable from at least one force in the set of initial forces, $F_0$.

With respect to the selected forces and indicators, the indicators, $F_s$, are leveraged to give priority to trajectories, and therefore are directed at scenarios containing forces to be emphasized. In an exemplary embodiment, the indicators $F_s$, is an empty set, user provided, or extracted from a crowd sourced location using natural language processing. Examples of crowd source locations include, but are not limited to, news and social media. In an exemplary embodiment, the set of selected forces, $F_o$, may serve as an indicator to a current situation of interest and employed to suggest crowd source locations. Additionally, a penalty function, $p_0$, can be used to assign one or more penalties for trajectories that do not include particular forces, and in an exemplary embodiment, assign a higher or more significant penalty to preferred forces. For example, to illustrate trajectories that contain as many forces in the set of forces, F, as possible before any trajectory that skips a force from the set of selected forces, $F_o$, the penalty function, $p_0$, is set to be greater than the maximum of the cost for the trajectory, mathematically represented as: $max_\phi(c(\phi))$. Similarly, in another example requesting prioritization of shorter trajectories, the prioritization logic prioritizes those trajectories that contain more forces from the set of selected forces, $F_o$, and set the penalty function, $p_0$, as follows: $max_{x,y \in F}(c(x,y))$.

The generation of the cost function may vary depending on the size of the FCM. In an embodiment, the values of the cost function, c, is based on a likelihood or impact of x causing y, where NLP is used to extract x and y from textual data. Similarly, in an exemplary embodiment, the cost function may be automatically generated for auto-generated FCMs and based on the number of support statements that were used to derive a specific edge, and using a function to map the frequency distribution into the cost function.

As shown and described in FIG. 6, the general scenario planning (GSP) problems is translated to a planning problem, where an artificial intelligence (AI) planning model is leveraged to traverse graphs that are defined by the FCM. The GSP problem, G, where G is defined as a tuple, G= $\langle M, F_0, F_*; F_o, F_s \rangle$, is provided or defined, and a desired quantity of trajectories, K, is provided or otherwise defined (602). Thereafter, a planning task, $\Pi_G$, which is defined as a set of P, A, I, G, cost, e.g. $\Pi_G = \langle P, A, I, G, cost \rangle$, is generated (604). With respect to the planning task, the following elements are defined, a set of predicates, P, a set of actions, A, an initial state I, and a goal, G. The set of predicates, P, is built as a union of the following sets:

{(not-started), (goalachieved)},
{(at x)|x∈F}, and
{(considered x)|x∈$F_o$}.

The set of actions, A, directed at traversing a graph of relations, and is defined as a union of the following sets:

{(enter x)|x∈$F_0$} with precondition {(not started)}, delete effect {(not started)}, add effect {(at x)}, and costs $c_0(x)$;
{(traverse x,y)|x,y∈F, c(x,y)<∞} with precondition {(at x)}, delete effect {(at x)}, add effect {(at y)}, and cost c(x,y);
{(achievegoal x)|x∈$F_*$} with precondition {(at x)}, delete effect {(at x)}, add effect {(goalachieved)}, and cost 0;
if a force on an edge can be explained {(explain x)|x∈$F_0$} with pre-condition {¬ (considered x), (at x)}, add effect {(considered x)}, and cost 1; and
if a force on an edge cannot be explained {(discard x)|x∈$F_0$} with pre-condition {{¬ (considered x), (goalachieved)}, add effect {(considered x)}, and cost $p_0$(x).

The initial state, I, consists only of (not-started), Finally, the goal, G, is defined as follows:

$$G = \{(goalachieved)\} \cup \{(considered\ x)\}|x \in F_o\}$$

The set of predicates, P, set of actions, A, initial state I, and goal, G, together with their corresponding cost(s) are necessary input to the planner. The explain actions are applied during traversal, and the discard actions are applied only after achievegoal has been attained. In an embodiment, the discard actions can be applied in any order, or in an exemplary embodiment, the discard actions can be applied in a particular order.

The step of generating the planning task, as shown and described at step (604), effectively translates the GSP problem into a planning problem. An artificial intelligence (AI) planner is executed based on the generated planning task in order to obtain a set of plans, $P_G$, (606). Each plan is a trajectory, e.g. a path through forces in the FCM. In an exemplary embodiment, there is a large quantity of plans generated at step (606), and as such the quantity may be limited to the top k plans. One plan has 1 path through the FMC, also referred to herein as an FCM graph, and k plans have k paths through the FCM. Considering the nodes on each path, e.g. plan, then multiple sets of nodes are returned, each set with its associated cost plan. A set of trajectories, $\Phi_G$, are computed (608). More specifically, at step (608) for each plan P∈$P_G$ the trajectory $\phi$ (P) is a sequence of forces $x_1, \ldots, x_n$ such that enter $(x_1), \ldots,$ enter $x_n$ is a sequence of all enter actions in P, ignoring all other action types.

In an embodiment, the solution set generated from the computation at step (608) may include a large quantity of trajectories, e.g. thousands of trajectories. As such, the solution set may be clustered based on similarity. Following step (608), it is determined if the quantity of trajectories in the solution set exceeds a threshold (610). In an exemplary embodiment, the threshold value is configurable. Following a positive response to the determination at step (610), a cluster process is executed. More specifically, a minimum and maximum quantity of clusters are specified (612), which in an exemplary embodiment, may be configurable, such as between 2 and 4 alternative future scenarios, and clustering of trajectories is executing using a clustering algorithm (614). In an embodiment, a hierarchical cluster algorithm is utilized at step (614) for the trajectory clustering. Each cluster of trajectories, e.g. paths through the FCM, forms a small sub-graph of the original FCM. The clustering essentially translates an abundant quantity of sets of plans in a bounded quantity of alternative scenarios, where each cluster in the result set is a set of plans corresponding to one alternative scenario. In an exemplary embodiment, after the plans, e.g. sets of nodes, have been clustered, subgraphs are re-constructed from each cluster (616), which in an exemplary embodiment, may be presented in a graphical or tabular format. Following the step (616) or a negative response to the determination at step (610), a set of trajectories, $\phi_G$, is returned with each trajectory being a valid trajectory representing a sequence of forces and accounting for cost(s) (618). Accordingly, given a GSP problem, defined as a tuple, G=$\langle M, F_0, F_*; F_o, F_s \rangle$, and a corresponding planning problem, $\Pi_G = \langle P, A, I, G, cost \rangle$, for each valid trajectory $\phi$ of G with quality c, there exists a plan of $\Pi_G$ that traverses the trajectory with cost c, and each plan of $\Pi_G$ induces a valid trajectory in G.

As shown and described in FIGS. 1-6, a computer system, program product, and method are provided to leverage neural causal extraction techniques to derive hidden causal relations in an identified corpus or library of text, e.g. documents. An AI planning model is utilized to capture the GSP, showing that scenarios can be derived from sets of plans for the corresponding planning problems. The neural causal techniques are applied to an existing collection of documents to produce a planning domain and problems collection, from which solutions to the planning domain and corresponding planning problem(s) are produced in the form of one or more trajectories.

Figure 7:
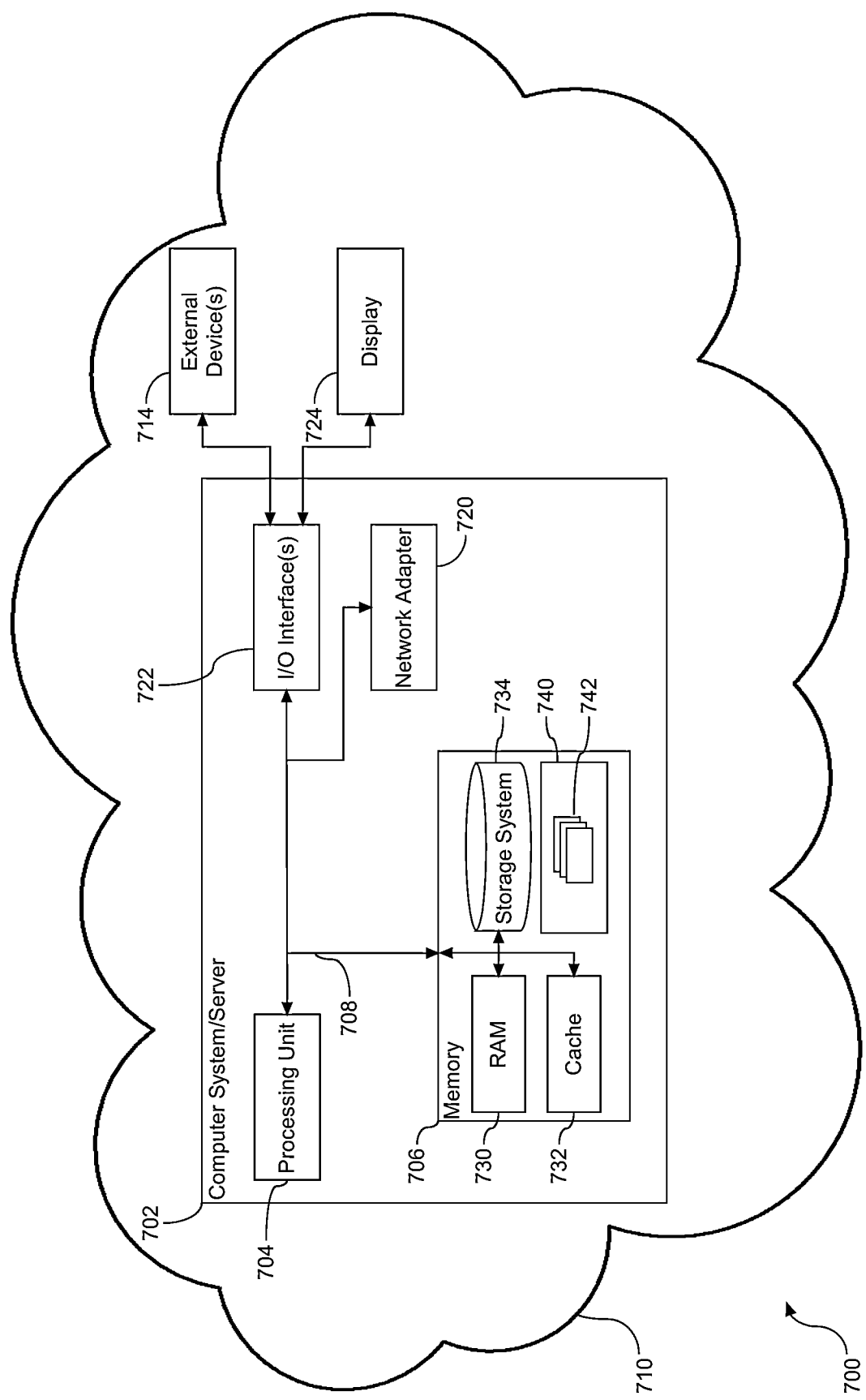
FIG. 7 depicts a block diagram illustrating an example of a computer system/server of a cloud based support system, to implement the system and processes described above with respect to FIGS. 1-6.

Embodiments shown and described herein may be in the form of a computer system for use with an intelligent computer platform for enriching performance of a dialog system and a corresponding automated virtual agent. Aspects of the tools (252), (254), (256), and (258) and their associated functionality may be embodied in a computer system/server in a single location, or in an embodiment, may be configured in a cloud based system sharing computing resources. With reference to FIG. 7, a block diagram (700) is provided illustrating an example of a computer system/server (702), hereinafter referred to as a host (702) in communication with a cloud based support system (710), to implement the system, tools, and processes described above in FIGS. 1-6. In an embodiment, host (702) is a node of a cloud computing environment. The host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The host (702) may be described in the general context of computer system-executable instructions, such as program modules, being executed by a computer system. Generally, program modules may include routines, programs, objects, components, logic, data structures, and so on that perform particular tasks or implement particular abstract data types. The host (702) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the host (702) is shown in the form of a general-purpose computing device. The components of host (702) may include, but are not limited to, one or more processors or processing units (704), e.g. hardware processors, a system memory (706), and a bus (708) that couples various system components including system memory (706) to processor (704). The bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The host (702) typically includes a variety of computer system readable media. Such media may be any available media that is accessible by the host (702) and it includes both volatile and non-volatile media, removable and non-removable media.

The system memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus (708) by one or more data media interfaces.

Program/utility (740), having a set (at least one) of program modules (742), may be stored in the system memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments to automating scenario planning For example, the set of program modules (742) may include the tools (252), (254), (256), and (258) as shown in FIGS. 2A and 2B.

The host (702) may also communicate with one or more external devices (714), such as a keyboard, a pointing device, etc.; a display (724); one or more devices that enable a user to interact with the host (702); and/or any devices (e.g., network card, modem, etc.) that enable the host (702) to communicate with one or more other computing devices. Such communication can occur via Input/Output (I/O) interface(s) (722). Still yet, the host (702) can communicate with one or more networks such as a local area network (LAN), a general wide area network (WAN), and/or a public network (e.g., the Internet) via network adapter (720). As depicted, the network adapter (720) communicates with the other components of the host (702) via the bus (708). In an embodiment, a plurality of nodes of a distributed file system (not shown) is in communication with the host (702) via the I/O interface (722) or via the network adapter (720). It should be understood that although not shown, other hardware and/or software components could be used in conjunction with the host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

The functional tools described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 8:
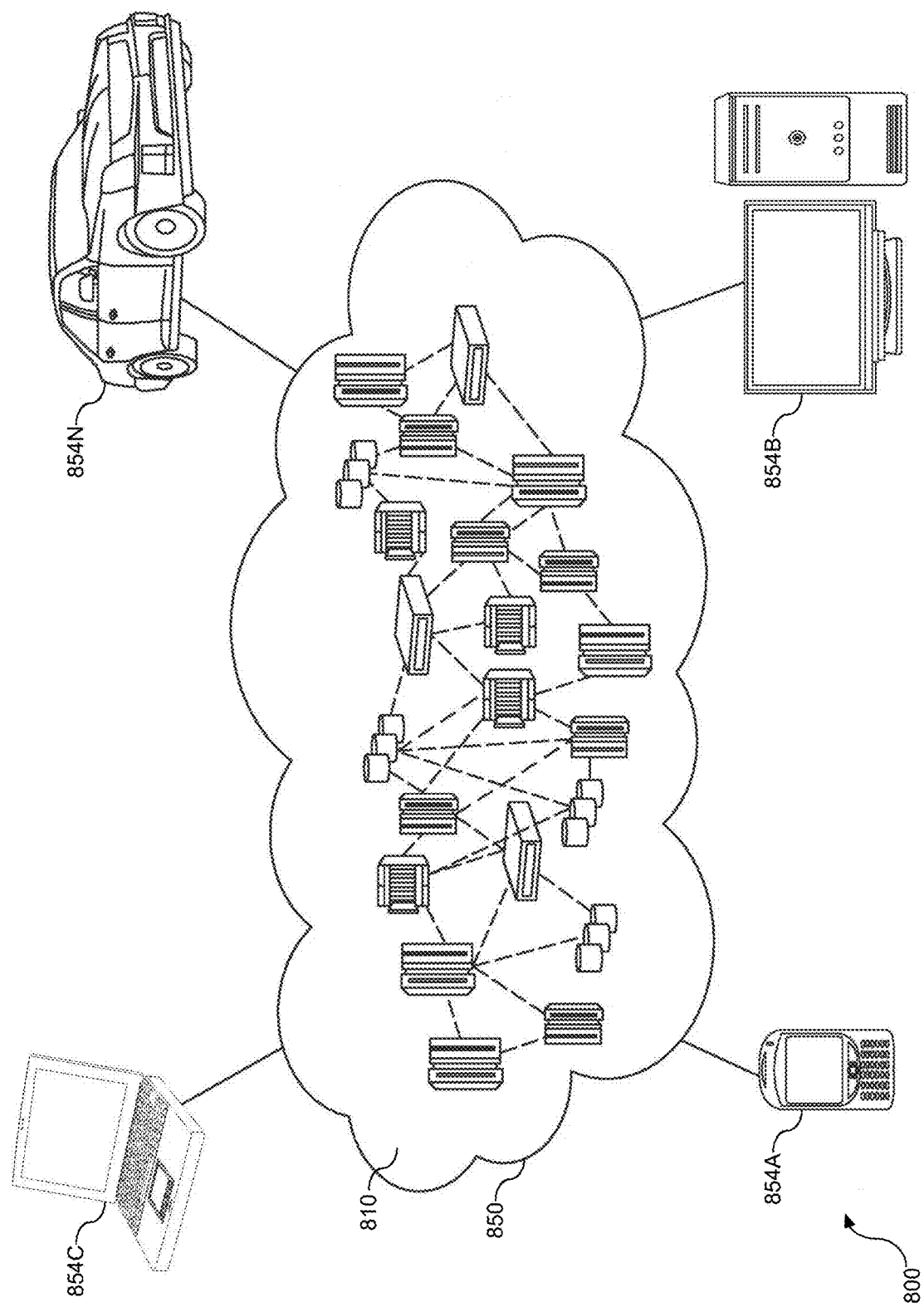
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
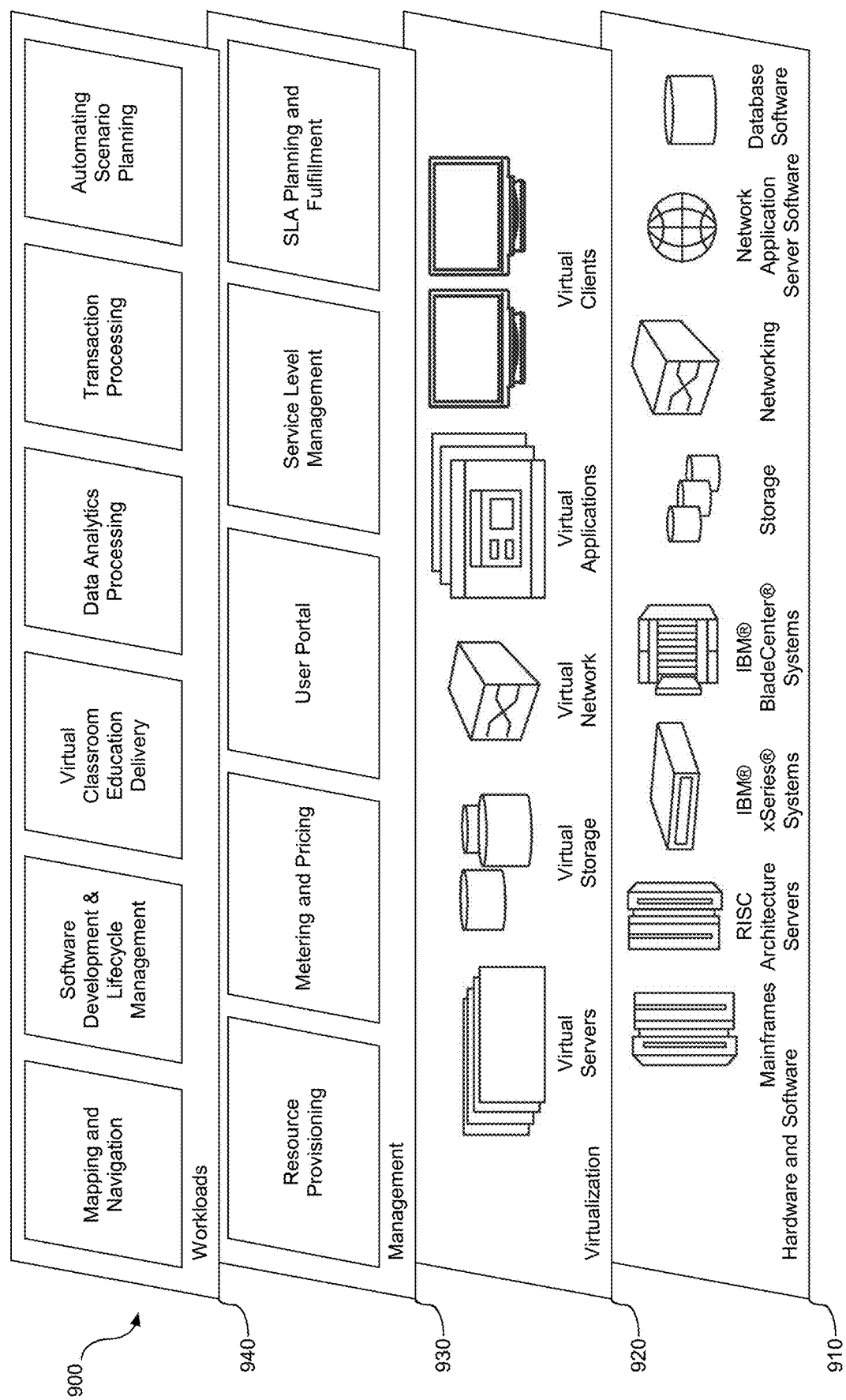
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940).

The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In an example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and automating scenario planning.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles. As used herein, the term "and/or" means either or both (or one or any combination or all of the terms or expressed referred to).

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to support automating scenario planning.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
a processor operatively coupled to memory;
an artificial intelligence (AI) platform, operatively coupled to the processor, comprising:
a natural language (NL) module configured to interpret a received NL issue requiring decision-making, and to identify a corpus of text related to the interpreted NL issue;
a force module configured to process the identified corpus of text to derive a document set of forces, wherein the set of forces are derived automatically by the force module, wherein deriving the document set of forces includes the force module to automatically derive a set of initial forces, a set of implication forces, a set of selected forces, a set of indicator forces from the identified corpus of text, and a final set of forces based on a ratio of the set of initial forces and the set of final forces being less than a threshold;
a forces causal model (FCM) module configured to leverage the document set of forces and automatically construct a corresponding FCM, wherein the automatically constructed corresponding FCM is configured to mitigate bias in a solution, and the FCM maps a force to a vector that describe properties of a sequence from a first node to a second node in a graph diagram;
a machine learning (ML) module configured to leverage the corresponding FCM to:
construct a general scenario planning (GSP) problem;
translate the GSP problem into a planning problem to obtain a set of plans, wherein each plan of the set of plans includes a valid trajectory through the FCM, wherein the valid trajectory starts at an initial force of the set of initial forces and passes through at least one implication of the set of implications; and
provide the solution to the planning problem, the solution including computing one or more trajectories; and
a visual interface configured to present the solution as the one or more trajectories.

2. The computer system of claim 1, wherein the one or more trajectories is the graph diagram containing one or more nodes and one or more edges, wherein each node represents a condition or event and each edge indicates a causal relationship between two nodes.

3. The computer system of claim 2, further comprising the ML module to provide an explanation for the one or more nodes and the one or more edges, including link each node and edge to one or more documents of the identified corpus of text.

4. The computer system of claim 1, wherein the solution includes a plurality of trajectories, and further comprising a cluster module operatively coupled to the ML module configured to cluster the plurality of trajectories using a clustering algorithm.

5. The computer system of claim 1, wherein the received NL issue is one or more phrases defining one or more events or conditions requiring decision-making, and further comprising the NL module to automatically extract the one or more phrases from an input source.

6. The computer system of claim 1, further comprising the ML module to:
define the GSP problem based on the FCM and the derived set of initial forces, set of implication forces, set of selected forces, and set of indicator forces;
leverage an artificial intelligence (AI) planner to generate a planning task, wherein output from the AI planner is the set of plans; and
compute the one or more trajectories for each plan in the set of plans, wherein each of the one or more trajectories is a sequence of forces.

7. A computer program product to support decision-making, the computer program product comprising
a computer readable storage medium or media; and
program code stored on the computer readable storage medium or media and executable by a computer processor that causes the processor to:
interpret a received natural language (NL) issue requiring decision-making, and to identify a corpus of text related to the interpreted NL issue;
process the identified corpus of text to derive a document set of forces, wherein the set of forces are derived automatically by a force module, wherein deriving the document set of forces includes the force module to automatically derive a set of initial forces, a set of implication forces, a set of selected forces, a set of indicator forces from the identified corpus of text, and a final set of forces based on a ratio of the set of initial forces and the set of final forces being less than a threshold;
leverage the document set of forces and automatically construct a corresponding forces causal model (FCM), wherein the automatically constructed corresponding FCM mitigate bias in a solution, and the FCM maps a force to a vector that describe properties of a sequence from a first node to a second node in a graph diagram;
employ machine learning (ML) to leverage the FCM, including:
construct a general scenario planning (GSP) problem;
translate the GSP problem into a planning problem to obtain a set of plans, wherein each plan of the set of plans includes a trajectory through the FCM wherein the trajectory starts at an initial force of the set of initial forces and passes through at least one implication of the set of implications; and
provide the solution to the planning problem, the solution including computing one or more trajectories; and
present the solution as the one or more trajectories via a visual interface.

8. The computer program product of claim 7, wherein the one or more trajectories is the graph diagram containing one or more nodes and one or more edges, wherein each node represents a condition or event and each edge indicates a causal relationship between two nodes.

9. The computer program product of claim 8, further comprising program code to provide an explanation for the one or more nodes and the one or more edges, including link each node and edge to one or more documents of the identified corpus of text.

10. The computer program product of claim 7, wherein the solution includes a plurality of trajectories, and further comprising program code to cluster the plurality of trajectories using a clustering algorithm.

11. The computer program product of claim 7, wherein the received NL issue is one or more phrases defining one or more events or conditions requiring decision-making, and further comprising program code to automatically extract the one or more phrases from an input source.

12. The computer program product of claim 7, further comprising program code to:
- define the GSP problem based on the FCM and the derived set of initial forces, set of implication forces, set of selected forces, and set of indicator forces;
- leverage an artificial intelligence (AI) planner to generate a planning task, wherein output from the AI planner is the set of plans; and
- compute the one or more trajectories for each plan in the set of plans, wherein each of the one or more trajectories is a sequence of forces.

13. A method of using a computing device to support decision-making, the method comprising:
- interpreting a received natural language (NL) issue requiring decision-making, and identifying a corpus of text related to the interpreted NL issue;
- processing the identified corpus of text and deriving a document set of forces, wherein the set of forces are derived automatically by a force module, wherein deriving the document set of forces includes the force module to automatically derive a set of initial forces, a set of implication forces, a set of selected forces, a set of indicator forces from the identified corpus of text, and a final set of forces based on a ratio of the set of initial forces and the set of final forces being less than a threshold;
- leveraging the document set of forces and automatically constructing a corresponding forces causal model (FCM), wherein the automatically constructed corresponding FCM mitigate bias in a solution, and the FCM maps a force to a vector that describe properties of a sequence from a first node to a second node in a graph diagram;
- employing machine learning (ML) for leveraging the corresponding FCM, the ML, including:
    - constructing a general scenario planning (GSP) problem;
    - translating the GSP problem into a planning problem to obtain a set of plans, wherein each plan of the set of plans includes a valid trajectory through the FCM wherein the valid trajectory starts at an initial force of the set of initial forces and passes through at least one implication of the set of implications; and
    - providing the solution to the planning problem, the solution including computing one or more trajectories; and
- presenting the solution as the one or more trajectories via a visual interface.

14. The method of claim 13, wherein the one or more trajectories is the graph diagram containing one or more nodes and one or more edges, wherein each node represents a condition or event and each edge indicates a causal relationship between two nodes, and further comprising providing an explanation for the one or more nodes and the one or more edges, including linking each node and edge to one or more documents of the identified corpus of text.

15. The method of claim 13, wherein the solution includes a plurality of trajectories, and further comprising clustering the plurality of trajectories using a clustering algorithm.

16. The method of claim 13, wherein the received NL issue is one or more phrases defining one or more events or conditions requiring decision-making, and further comprising automatically extracting the one or more phrases from an input source.

17. The method of claim 13, further comprising:
- defining the GSP problem based on the FCM and the derived set of initial forces, set of implication forces, set of selected forces, and set of indicator forces;
- leveraging an artificial intelligence (AI) planner to generate a planning task, wherein output from the AI planner is the set of plans; and
- computing the one or more trajectories for each plan in the set of plans, wherein each of the one or more trajectories is a sequence of forces.

* * * * *